United States Patent
Scuotto et al.

(10) Patent No.: US 9,407,126 B2
(45) Date of Patent: Aug. 2, 2016

(54) DIRECT-DRIVE SUPERCONDUCTING SYNCHRONOUS GENERATOR FOR A WIND TURBINE

(71) Applicants: Mattia Scuotto, Vipiteno (IT); Gustavo Sarmiento Muñoz, Vizcaya (ES); María Jose Merino Azcárraga, Vizcaya (ES); Javier Garcia-Tejedor Perez, Vizcaya (ES); Pedro Ibañez Ereño, Vizcaya (ES); Susana Apiñaniz Apiñaniz, Vizcaya (ES)

(72) Inventors: Mattia Scuotto, Vipiteno (IT); Gustavo Sarmiento Muñoz, Vizcaya (ES); María Jose Merino Azcárraga, Vizcaya (ES); Javier Garcia-Tejedor Perez, Vizcaya (ES); Pedro Ibañez Ereño, Vizcaya (ES); Susana Apiñaniz Apiñaniz, Vizcaya (ES)

(73) Assignee: Fundacion Tecnalia Research & Innovation, Zamudio Vizcaya (ES)

( * ) Notice: Subject to any disclaimer, the term of this patent is extended or adjusted under 35 U.S.C. 154(b) by 366 days.

(21) Appl. No.: 13/954,879

(22) Filed: Jul. 30, 2013

(65) Prior Publication Data
US 2014/0009014 A1    Jan. 9, 2014

Related U.S. Application Data

(63) Continuation of application No. 13/520,121, filed as application No. PCT/ES2009/070639 on Dec. 30, 2009, now abandoned.

(51) Int. Cl.
*H02K 55/04*  (2006.01)
*H02K 9/10*   (2006.01)
*H02K 7/18*   (2006.01)
*H02K 9/19*   (2006.01)

(52) U.S. Cl.
CPC ............... *H02K 9/10* (2013.01); *H02K 7/1838* (2013.01); *H02K 55/04* (2013.01); *Y02B 10/30* (2013.01); *Y02E 10/725* (2013.01); *Y02E 40/625* (2013.01)

(58) Field of Classification Search
CPC ........... H02K 9/19; H02K 9/20; H02K 55/00; H02K 55/01; H02K 55/02; H02K 55/03; H02K 55/04; B63H 2005/1258; B63H 21/17; B63H 23/00
USPC ............. 310/194, 149, 52, 53, 54, 55, 56, 57, 310/58, 59, 61, 62, 60 R, 63, 60 A, 64, 65
See application file for complete search history.

(56) References Cited

U.S. PATENT DOCUMENTS 5,482,919 A *  1/1996  Joshi ......................... F25B 9/14
                                                       310/52
6,313,556 B1 * 11/2001  Dombrovski ............ H02K 3/24
                                                       29/596

(Continued)

FOREIGN PATENT DOCUMENTS

WO    WO 95/08211 A1    3/1995
WO    WO 03/047961 A2   6/2003

OTHER PUBLICATIONS

International Search Report issued by the International Searching Authority (ISA/EPO) on May 11, 2011 in connection with International Application No. PCT/ES2009/070639.

*Primary Examiner* — Michael Andrews
(74) *Attorney, Agent, or Firm* — Cooper & Dunham LLP; Gary J. Gershik

(57) ABSTRACT

The invention refers to a direct drive electric generator for a wind turbine provided with rotor salient poles and a ladder-like cryostat for housing superconductive coils and keeping them at a cryogenic temperature while the interior of the cryostat is kept free of coolant.
The invention achieves optimal thermal insulation of the coils without the need of a continuous re-filling of the cryostat and ensuring a good distribution of the magnetic field avoiding the use of expensive materials.

6 Claims, 9 Drawing Sheets

(56) References Cited

U.S. PATENT DOCUMENTS

| | | | |
|---|---|---|---|
| 6,911,759 B2 * | 6/2005 | Kalsi | H02K 3/14 310/184 |
| 7,018,249 B2 * | 3/2006 | Ries | B63H 5/125 440/6 |
| 7,285,881 B2 * | 10/2007 | Steinmeyer | H02K 9/00 310/52 |
| 2008/0024034 A1 * | 1/2008 | Koizumi | H02K 5/128 310/266 |
| 2009/0229291 A1 * | 9/2009 | Winn | H02K 55/04 310/58 |

* cited by examiner (A-A)

DIRECT-DRIVE SUPERCONDUCTING SYNCHRONOUS GENERATOR FOR A WIND TURBINE

This application is a continuation of U.S. Ser. No. 13/520,121, which is a §371 national stage application of PCT International Application No. PCT/ES2009/070639, filed Dec. 30, 2009, the contents of each of which are hereby incorporated by reference into this application.

TECHNICAL FIELD OF THE INVENTION

The present invention lies within the technical field of electric generators that comprise a rotor and a stator for the production of electric power and, particularly, to low-speed, direct-drive synchronous generators comprising superconducting field windings for use in wind turbines.

BACKGROUND OF THE INVENTION

Wind turbines are nowadays considered as a "green" source of energy and, in fact, belong to one of the most developed renewable technologies. Most wind turbines are horizontal-axis wind turbines having a rotor provided with three blades connected to a main rotor shaft and an electrical generator mounted within a nacelle at the top of a tower. Many conventional types of wind turbines comprise a gearbox that converts the relatively slow rotation of the wind turbine rotor into a faster rotation to drive the electric generator rotor. Electric generators and electric machines in general, exhibit poor efficiency when driven at very low speed. Moreover, slow electric machines have to exhibit higher torque in order to compensate for the reduced rotational speed of the machine rotor, since machine power output is always yield by torque times the rotational speed. Gearboxes reduce the efficiency of the conversion of wind energy into mechanical energy used for driving the electric generator rotor and are moreover rather expensive, need intensive and scheduled maintenance and are open to wear-out and thereto related failures. Direct-drive generators based on conventional electric machines technologies do not comprise gearboxes and thus lack the disadvantages thereof, but are intrinsically heavier and larger. This is remarkably the case of slow electric generators for wind turbines whose nacelles, equipped with such generators, are more difficult to lift, to place and to balance on towers so that they are rather unsuitable for high-power producing generators as wind turbines.

To overcome the drawbacks of conventional direct-drive generators, direct-drive synchronous generators comprising superconducting field windings providing an increased torque density for use in wind turbines have been described.

Superconductivity is inherent to certain materials generally at very low temperatures, leading to zero DC electrical resistance and the exclusion of the interior magnetic field (at given temperature and current density, there is a maximum magnetic field the superconductor can expel; as the field exceeds this value the superconductor becomes a normal conductor and exhibit ohmic resistance). Superconductivity occurs in a wide variety of materials, including simple elements like tin and aluminum, but also in other materials such as various metallic alloys and some heavily-doped semiconductors, in some lanthanum- and yttrium-based cuprate perovskite materials, ceramic materials consisting of thallium, mercury, copper, barium, calcium and oxygen, lanthanum oxygen fluorine iron arsenide. An especially interesting superconductor from a practical point of view is magnesium diboride, a conventional superconductor, that is relatively easy to synthesize and manufacture in long wires and which has a critical transition temperature of 39 K in bulk or powder form.

Usually, copper field windings of a conventional synchronous machine are found buried in the rotor slots or wound around rotor salient iron poles, while armature windings are hosted within slots and separated by iron teeth in the stator. These iron elements strengthen and efficiently guide the magnetic flux across the machine air-gap, that is, the radial separation existing between the rotor surface or rotor poles and the stator teeth. Superconducting field windings can carry much more current (Ampere·turns) than conventional ones, thus producing higher magnetic fields. Therefore, some iron elements can be dispensed. In superconducting machines, the magnetic circuit of the electric machine comprises two iron annularly shaped elements, the rotor back-iron and the stator back-yoke. To establish a high flux density in the large air-gap, a very high magnetomotive force is needed. With a configuration as such, with the superconducting field coils located above the annular rotor back-iron, the highest magnetic fields are usually found right on the superconductors. Most recent prototypes of superconducting machines implement High Temperature Superconductors (HTS) with a transition temperature above 77K (boiling point of Nitrogen) such as YBCO and BSSCO. These superconductors can take high fields (2.5-3.5 T) at a reasonably low temperature (20-40K). However, this class of superconductors is very expensive as BSCCO has silver matrix and YBCO is very difficult to manufacture in long pieces such as those required for coils, and the production requires time-consuming processes and complicated technologies. As a consequence, electric machines implementing HTS are too expensive.

Other materials, such as NbTi (Tc 9K) or Ni3Sn (Tc 18K), have been considered in the past for this application. However the performance of these superconductors is interesting at temperatures of 4.2K (boiling point of Helium) or below. Plants for liquifying helium are also very expensive. Moreover, the lower the temperature, the more unstable is the cryogenic system. These are serious disadvantages of LTS machines.

Magnesium diboride offers an interesting compromise: On the one hand, it is much cheaper and is operated at temperatures in the order of 15-25K. On the other hand, to carry high currents at these temperatures, existing wires based on magnesium diboride cannot take very high magnetic fields, usually well below 2 T. Therefore to achieve adequate performance, the magnetic circuit of superconducting synchronous electric machines based on magnesium diboride wires and cheap materials with similar characteristics should comprise salient iron poles protruding from the rotor back iron. The iron poles divert the magnetic flux from the superconducting coils and reduce the circuit reluctance.

Usually, superconductors are kept at the proper operating cryogenic temperature in special vessels called cryostats. Known prototypes of superconducting machines often exhibit a "cold rotor" design, where a cryostat encloses
  the superconducting coils
  the rotor back-iron
  the rotor frame.

The "cold rotor" design as the one disclosed in WO-A 2007/033858 is not suitable for salient poles rotor, because the cryostat external jackets above the poles would require extra space, thus making the air-gap longer and having a negative effect in the magnetic field distribution. This feature would reduce the efficiency of the magnetic circuit.

In the "wet cold" system as the one disclosed in patent EP-A-1959548, the super conductive part is immersed in a coolant, in gas or liquid state, and is isolated from the outside in the cryostat. Heat generated by external or internal sources is exchanged with the coolant and is extracted outside the cryostat in order to keep the machine under the proper operation temperature. In case of liquid coolant, the cooling procedure may involve a phase change to the gas state. Both gas He and liquid He (boiling temperature 4.2K) have been widely used as coolant. As He is a very expensive element, several closed-cycle systems have been developed to recover these expensive gas, and, even, liquefied it again. As well, some machine prototypes have been developed with cooling systems based on liquid Ne (boiling temperature 27K) and liquid nitrogen (boiling temperature 77K), depending on the SC material. All of them need a continuous re-filling of the cryostat or expensive recovery systems based on liquid plants.

DESCRIPTION OF THE INVENTION

The present invention is intended to overcome the aforementioned drawbacks of the prior art by providing a direct-drive electric generator as claimed in claim 1.

The warm poles rotor, i.e the "warm rotor" holds a cryostat of suitable geometry. We will refer to the cryostat of aforementioned geometry as the "Hamster wheel" type. Inside the cryostat, the superconducting field windings preferably based on magnesium diboride wire, are kept at the proper cryogenic temperature. This design has a series of advantages with respect to conventional "cold rotor" designs:
  rotor materials are conventional;
  the outer surface of the cryostat is reduced so that the radiation thermal flux entering the cryostat is minimized;
  volume and mass within are reduced so that the time for respectively creating the vacuum and cooling the coils is reduced;
  the cryostat can be made modular, each coil comes with its own cryostat element case so that once all elements are in place on the rotor, co-planar inter-case surfaces of the outer jacket may receive appropriate sealing, such as vacuum-proof weldings or else;
  the radial extension of the cryostat above the superconducting field windings may be reduced, and therefore, reducing the space between rotor poles and stator armature winding and improving the magnetic flux in the air-gap;

Moreover, the cryogenic system is based on cryocoolers in a "cryogen free" system, thus a "dry-cold" cryogenic system design, as no coolant enters the cryostat. The cryocoolers extract the heat entering the cryostat via properly designed thermal circuits located inside the cryostat.

In a Gifford-McMahon (GM) cryocooler, for example, Helium gas undergoes a closed thermodynamic cycle, usually comprising a one or two-stages gas expansion. GM-coolers are well known by the industry.

The main components of a GM-cooler are: the cold head (where He gas expands), the compressor and the two flexible lines for delivering the coolant. The cold head has two stages, related with the two thermodynamic sub-cycles which are realized inside, at two different temperatures, henceforth referred to as "high-temperature" and "low-temperature". In the surface of each stage—usually made of a high conductive material as oxygen free copper—the heat is extracted. In dependence of the heat loads, a typical "high-temperature" is around 80K and "low-temperature" is around 15K.

In a preferred embodiment of the cryocooling means, the cryocooler compressor is stationarily positioned. Coolant delivery to and recovery from the cold head, anchored to the generator rotor cryostat, occur via a double-chamber rotary feedthrough. Each chamber is connected to at least one coolant outlet and one coolant inlet. The number of connections depends on the number of cold heads and compressors the cryocooling system may comprise. The lines connecting the compressor with the rotary feedthrough and the feedthrough to the cold head can be flexible.

In accordance with another embodiment, the cryostat comprises a single multi-modules unit. Each module comprises a portion of two partly interconnected thermal circuits, a very high thermal conductivity element enclosing the superconducting coil endeavoring the functions of coil thermal anchoring, former and frame, a radiation shield, a cryostat external jacket and a number of low thermal conductivity rests. The radiation shield is housed in the cryostat external jacket. The interconnected plurality of modular radiation shields sets up the cryostat high-temperature thermal circuit which delivers part of the heat entering from outside and/or generated within the cryostat to the high-temperature stage of the cold heads. Thermal anchoring and former elements are hosted within the radiation shield. The superconducting coil thermal anchoring and heat transmission elements set up the cryostat low-temperature thermal circuit which delivers part of the heat entering from outside and/or generated within the radiation shields to the low-temperature stage of the cold heads. In this embodiment the cryostat comprises interpolar transverse sections positioned between the adjacent iron poles, each interpolar section comprising:
  a transverse portion of the cryostat external jacket comprising an outer transverse U-shaped channel provided with a first insulation and closed by a transverse portion of an outer cover plate;
  a transverse portion of the radiation shield comprising an inner transverse U-shaped channel provided with a second insulation and closed by a transverse portion of an inner cover plate;
  two transverse portions of respectively two adjacent thermal anchoring and former elements separated from each other by a transverse space;
  the transverse portion of the radiation shield is positioned within the second insulation in the transverse portion of the cryostat external jacket;
  the two transverse portions of the adjacent thermal anchoring and former elements are positioned within the first insulation in the transverse portion of the radiation shield.

On the other hand, since heat adds up along the circumferential branches of the thermal circuits, the thermal transmission elements of each of the thermal circuits are made thicker the nearer they are to a cold head so to be able to conduct the increasing heat flux.

In accordance with an embodiment of the invention, the rotary feedthrough may be comprised of
  a low pressure chamber connected to a low pressure circuit and fluidly connected to a first stage of at least one cold head, said first stage being thermally coupled to the low-temperature circuit in the cryostat;
  a high pressure chamber housed within the low pressure chamber and fluidly connected to a high pressure circuit thermally coupled to a second stage of at least one cold head, said second stage being thermally coupled to the high-temperature circuit in the cryostat;
  a low pressure sealing structure dividing the low pressure chamber into a stationary low pressure portion and a rotary low pressure portion, the rotary low pressure portion being rotary in the low pressure sealing structure;
  a high-pressure sealing structure dividing the high-pressure chamber into a stationary high-pressure portion and a rotary high-pressure portion, the rotary high-pressure portion being rotary in the high pressure sealing structure, the high pressure sealing structure being mounted to the low pressure sealing structure.

In this embodiment of the rotary feedthrough the stationary low pressure portion may be fixed to a support that comprises an annular supporting portion in which the rotary low pressure portion is rotatably supported. For this purpose, the rotary low pressure portion has a peripheral annular thickening or other protruding and/or other annular reinforcing elements and bearings located between the annular supporting portion and the annular thickening. On the other hand, the rotary low pressure portion may comprise a low pressure inlet connected to a low pressure inlet pipe that is connected to a flexible recovery line, and the stationary low pressure portion may comprise a low pressure outlet connected to a low pressure outlet pipe, such that coolant flowing from the cold heads through the flexible recovery line enters the low pressure chamber through the low pressure inlet, leaves the low pressure chamber through the low pressure outlet in the stationary low pressure portion and is lead to the cryocooler compressor through the low pressure outlet pipe. Inside the low pressure chamber there is a high pressure chamber comprised within a stationary high pressure chamber portion and a rotary high pressure chamber portion. The stationary high pressure portion may comprise a high pressure inlet connected to a high pressure inlet pipe that extends through the low pressure chamber, penetrates the vertical wall of the stationary low pressure portion and thus connects the high pressure chamber with the cryocooler compressor. The rotary portion may comprise a high pressure outlet connected to a high pressure outlet pipe that extends through the low pressure chamber in an opposite direction, penetrates through the vertical wall of the rotary low pressure portion and connects with a flexible delivery line. Thereby, high pressure coolant is delivered from the compressor to the cold heads. The high pressure chamber portions are coupled to each other by a high pressure sealing structure such that the rotary high pressure portion rotates in respect of the stationary high pressure portion. The high pressure sealing structure is connected to the low pressure sealing structure. The rotary high pressure portion and the rotary low pressure portion thus rotate simultaneously with the rotor of the wind turbine.

The periphery of the low pressure sealing structure may be enclosed by an annular leakage recovery casing comprising an inner leakage recovery chamber and a recovery outlet. Coolant leaking through the low pressure sealing is retained within the recovery chamber from where it may be extracted through the recovery outlet.

In the afore described high pressure sealing structure of the rotary feedthrough, the sealing portion is made of a material providing low friction to allow rotation of the rotary high pressure portion and good sealing properties to minimize leakage of the high pressure coolant. Coolant leaking from the high pressure chamber enters the low pressure chamber and is transported to the compressor. The low pressure sealing portion of the low pressure sealing structure may be lubricated with a suitable lubricant such as oil.

As apparent from the above, the present invention overcomes the above-described drawbacks of state-of-the-art low-speed direct-drive generators and superconducting synchronous generators for large wind turbines in an efficient manner by means of a structure that is rather cheap and conventional to manufacture.

BRIEF DESCRIPTION OF THE DRAWINGS

Hereinafter, aspects and embodiments of the invention will be described on the grounds of drawings wherein.

Figure 1:
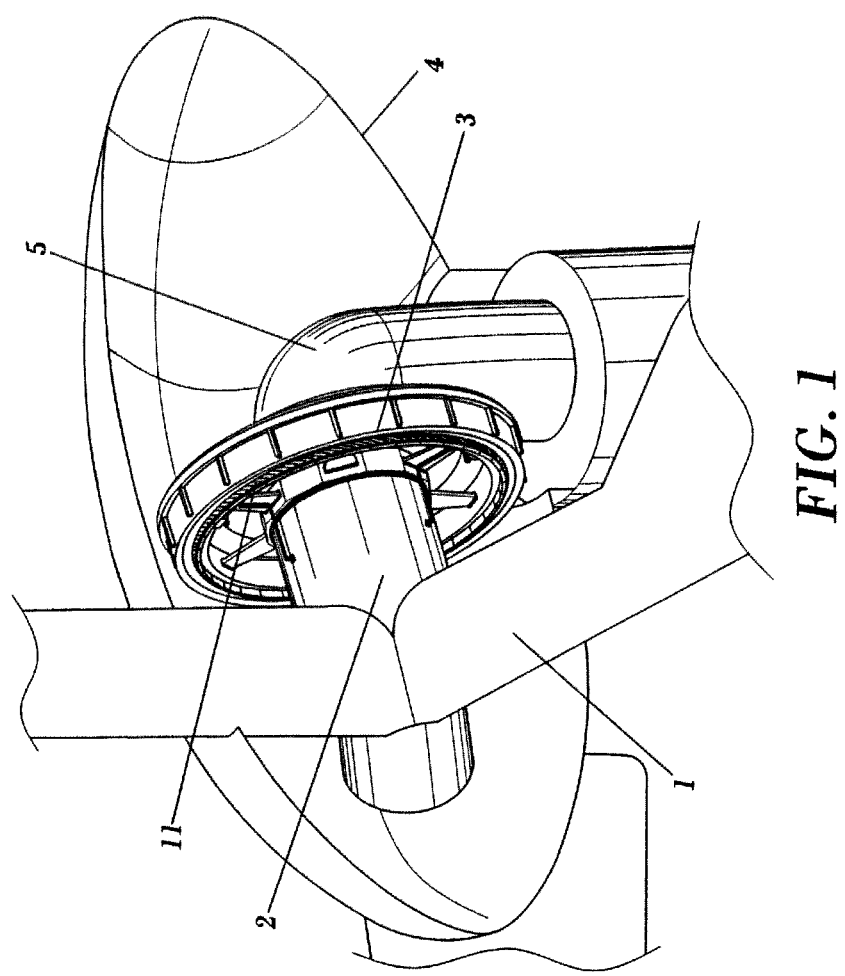
FIG. 1 is a partial schematic broken-up side perspective view of a wind turbine using a direct-drive generator as per the present invention.

In these figures, there are reference numbers identifying the following elements 1 wind turbine rotor hub/blades
2 rotor shaft
3 generator
4 nacelle
5 generator frame/nacelle integration system
6 rotor iron poles
7 rotor back iron
8 stator back-yoke
9 stator frame
10 cryostat
11 air-gap windings
12 air-gap windings frame
13 rotor electromagnetic shield
14 rotor frame
15 cryocooler compressor
16 rotary feedthrough
16a stationary low pressure portion
16b rotary low pressure portion
16c stationary high pressure portion
16d rotary high pressure portion
16e low pressure chamber
16f high pressure chamber
16g high pressure inlet pipe
16h low pressure outlet pipe
16i high pressure outlet
16j low pressure inlet
16k high pressure inlet
16l low pressure outlet
16m annular thickening
16n low-pressure inlet pipe
16o high-pressure inlet pipe
17 flexible lines
17a flexible delivery line
17b flexible recovery line
18 cryocooler cold head
18a first cold head stage
18b second cold head stage
19 cryostat external jacket
20 cryostat radiation shield
21 superconducting coil thermal anchoring, former and frame
22 low-temperature thermal circuit element
23 high-temperature thermal circuit element 24 superconducting coil
25 inner lateral portion of the superconducting coil thermal anchoring, former and frame
26 inner lateral portion of the radiation shield module
27 lateral U-shaped profile
28 transversal U-shaped profile
29 inner rest
30 outer rest
31 lateral L-shaped profile
32 transversal hollow portion (low temperature anchoring element)
33 inner cover plate
34 outer cover plate
35 outer multi-layer insulation
36 inner multi-layer insulation
37 transversal L-shaped wing
39 corner piece
40 inner casing
41 support for rotary feedthrough
41a annular supporting portion
41b bearing
42 low pressure rotary (or stationary) sealing structure
43 annular leakage recovery casing
43a leakage recovery chamber
43b recovery outlet
44 high pressure rotary sealing structure
45 low temperature thermal circuit
45a low temperature connection to cold head
46 high temperature thermal circuit
46a high temperature connection to cold head

EMBODIMENTS OF THE INVENTION

FIG. 1 shows a horizontal axis wind turbine for generating 5-10 MW comprising a rotor hub -1- provided with blades (only two blades shown in FIG. 1) linked to a rotor shaft -2- that is connected to a direct-drive synchronous superconducting electric generator -3-. The electric generator is mounted on a generator frame -5-. The rotor hub -1-, rotor shaft -2- and the generator -3- are located in a nacelle -4- that is pivotably mounted on a top portion of a tower in a manner know per se.

Figure 2:
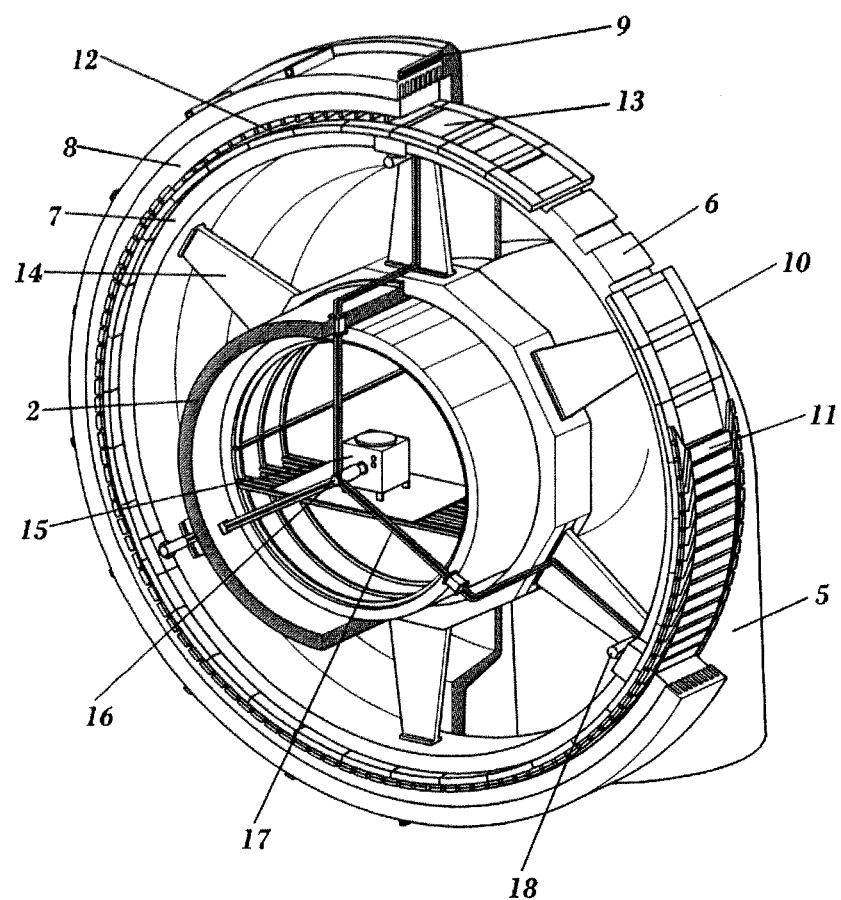
FIG. 2 is a schematic, partially broken up front perspective view of an embodiment of a generator according to the present invention as included in the wind turbine shown in FIG. 1.
Figure 3:
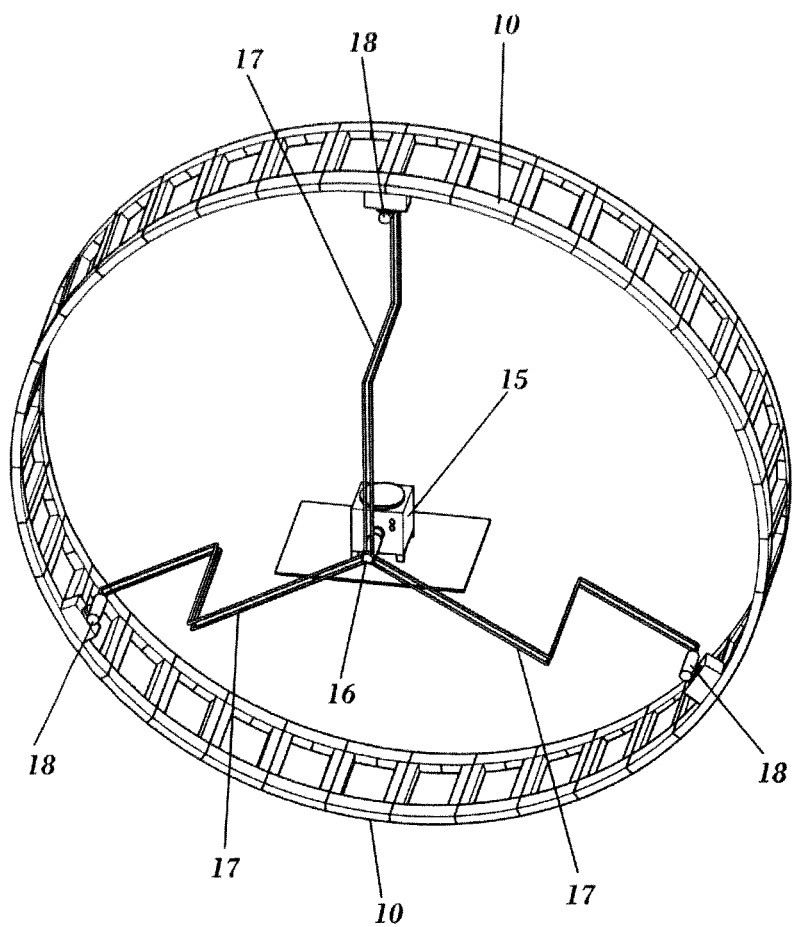
FIG. 3 is a schematic front perspective view of the overall cryogenic system of the generator shown in FIG. 2.

As shown in FIGS. 2 and 3, the electric generator -3- comprises a rotor with rotor frame -14- that is connected to the rotor shaft -2- and to an annular laminated rotor back iron -7- with outer rectangular laminated rotor iron poles -6- which protrude from the back iron peripheral surface.

The rotor frame -14- rotates within a stator comprising an annular stator frame -9- with an inner stator back yoke -8-. The stator frame -9- is connected to the generator frame -5-. By this arrangement, wind-driven rotation of the rotor hub -1- makes the rotor frame -14- rotates within the stator frame -9-.

Each rotor iron pole -6- is framed by the cryostat -10- and may be covered by an external, thin, annular electromagnetic shield -13- that is mounted around the whole air-gap surface of the rotor. Each module of the cryostat -10- encloses a superconducting coil (not shown in FIGS. 1 and 2) made from, for example, magnesium diboride wire, wound in coils as field windings in the rotor. The superconducting coils are operated at cryogen temperature typically in the range of 10-25 K. The cryostat -10- isolates the superconducting coils from the warm parts of the generator, for instance the iron poles -6-, and the outside atmosphere. Inside the cryostat -10-, low-pressure is generated and maintained via vacuum pumps (not shown in the drawings).

An annular stator air-gap windings frame -12- comprising a plurality of air-gap windings -11- facing the cryostat -10- and electromagnetic shields -13- is mounted to the inner surface of the stator back yoke -8-. The stator windings, also called armature windings, carry 3-phase AC and can be controlled by a power electronics AC/DC-DC/AC converter. Armature windings may require a dedicated cooling system, based on water, oil or forced air circulation, according to the need. The generator further comprises a cryogenic cooling system comprising a cryocooler compressor -15- connected by means of a rotary feedthrough -16- to pairs of flexible lines -17- respectively connected to cryocooler cold heads -18- that, in turn, are connected to the cryostat -10-. The compressor -15- is stationarily positioned inside the rotor. The rotary feedthrough -16- is used when a compressor -15- that is not capable of rotating is used. The pairs of flexible lines -17- are used to circulate the coolant, gas helium in the embodiment shown in the figures, through the cold-heads -18-. The sealing of the rotary joint of the feedthrough -18- can minimize the leakage by implementing, for example, ferrofluid technology. A Gifford-McMahon-type cryocooler comprising the cold head -18- and the compressor -15- connected by to the pairs of flexible lines -17- by the high-pressure rotary feedthrough -16- is adequate as cooling system. Alternatively, the compressor can be designed to rotate so that the feedthrough would not be necessary.

Figure 4:
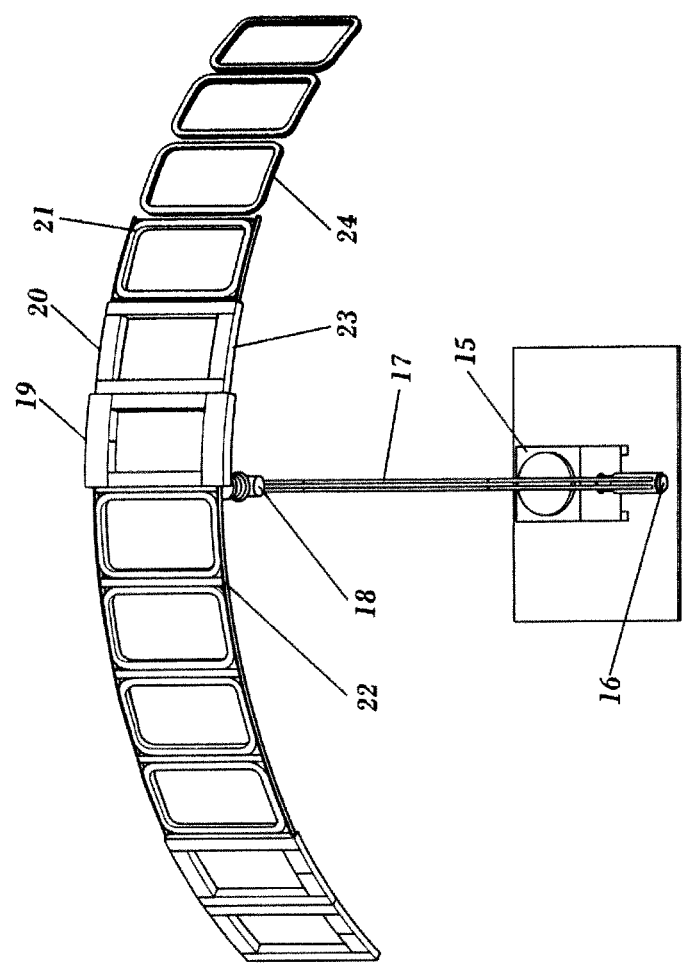
FIG. 4 is a partial schematic view of the cryostat and the cooling system of the generator shown in FIG. 2.
Figure 5:
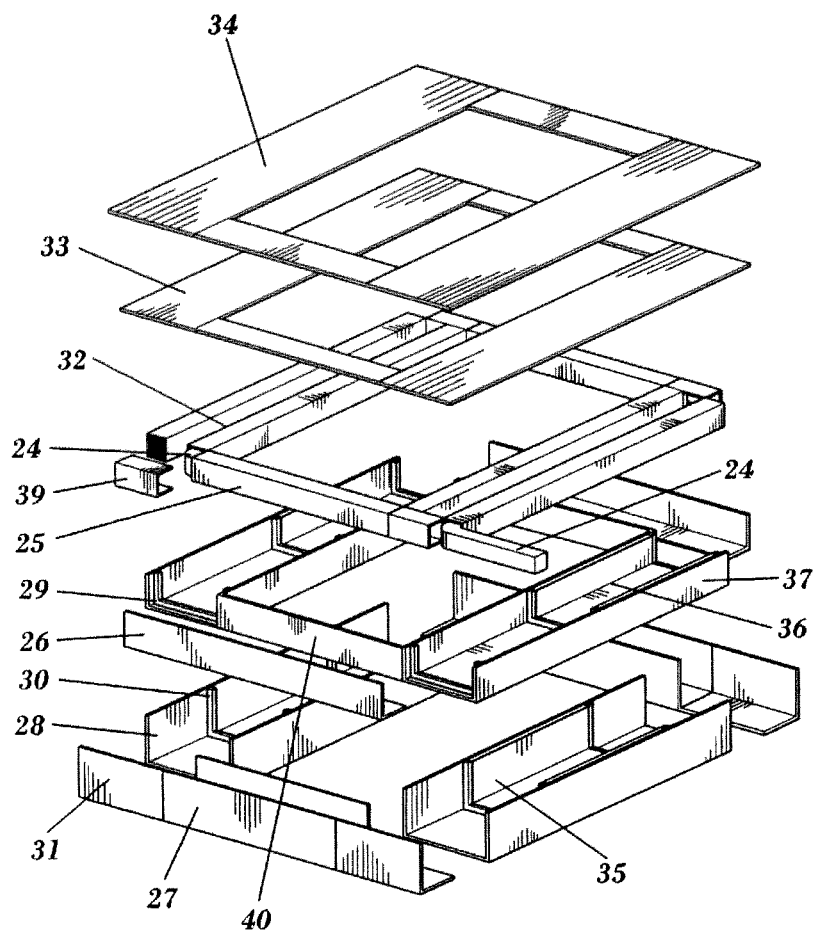
FIG. 5 is an exploded view of a cryostat polar element according to an embodiment of the present invention for the generator shown in FIG. 2.
Figure 6:
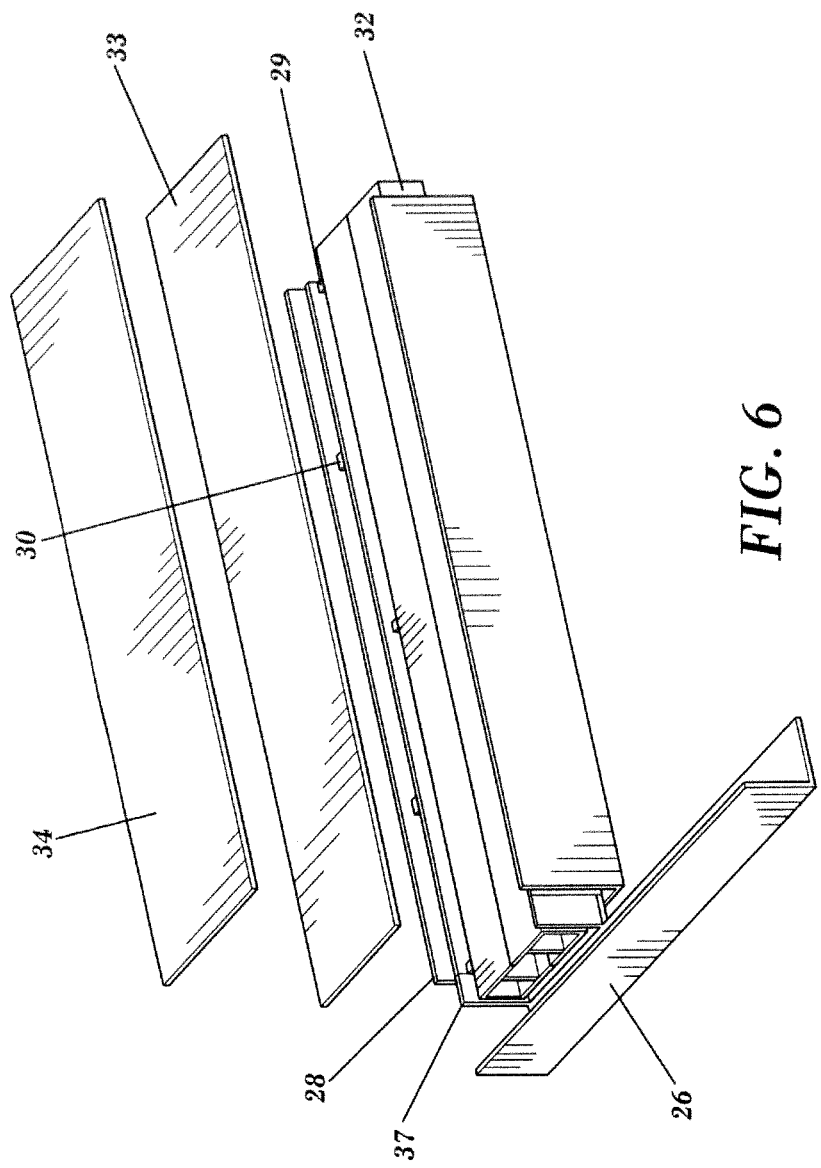
FIG. 6 is a partially exploded view of a cryostat interpolar unit for the generator shown in FIG. 2.

FIGS. 4-6 show more details of the cryogenic system used to cool and to keep the superconductive coils -24- that are positioned within the cryostat -10- at the proper operation temperature. The cryostat -10- comprises a single multi-modules unit. Each module comprising a portion of two partly interconnected thermal circuits elements -22,23-, a very high thermal conductivity element -21- enclosing the superconducting coil -24- endeavoring the functions of coil thermal anchoring, former and frame, a radiation shield -20-, a cryostat external jacket -19- and a number of low thermal conductivity rests -29,30-.

In accordance with FIG. 4, the superconducting coils -24- are in the shape of rectangular frames with arched corner sections and are enclosed by and in thermal contact with frame-like thermal anchoring and former elements -21-. The superconducting coil thermal anchoring, former and frame elements -21- are housed in case-like radiation shields -20-, and each of the so-formed assemblies is housed in an external jacket -19-. Each module of the radiation shield -20- sets up the cryostat high-temperature thermal circuit element -23- which delivers part of the heat entering from outside and/or generated within the cryostat module. Superconducting coil thermal anchoring elements -21- set up the cryostat low-temperature thermal circuit element -22- which delivers part of the heat entering from outside and/or generated within the radiation module -20-.

Figure 8:
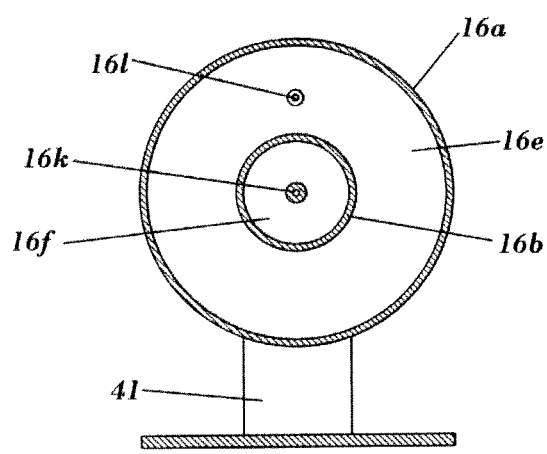
FIG. 8 is a sectional view along the line A-A of the rotary feedthrough shown in FIG. 7.

As apparent from FIGS. 5 and 8, the thermal anchoring and former elements -21- enclosing each superconductive coil -24- are comprised of two opposed hollow lateral portions -25- and two opposed hollow transverse portions -32-, forming a rectangular frame the corner portions of which are closed by lateral corner pieces -39-.

The cryostat radiation shield -20- comprises a plurality of radiation shield units comprising a rectangular casing -40- having two lateral walls and two transverse walls surrounding an opening, and two transverse L-shaped wings -37- that project outwardly at the bottom of the inner transverse walls of the casing -40-, such that an inner U-shaped channel is formed by one of the transverse walls and one of the L-shaped wings -37-. Each of the inner U-shaped channels comprises three inner U-shaped low thermal conductivity rests -29- for supporting inner U-shaped multi-layer insulations -36- that form a transverse inner U-shaped insulating channel for the radiation heat. The cryostat radiation shield unit further comprises two lateral L-shaped profiles -26- respectively positioned facing the lateral walls of the inner casing -40- such that each of the lateral L-shaped profiles -26- forms a lateral inner U-shaped channel with one of lateral walls of the inner housing -40-. The lateral L-shaped profiles -26- are shorter than the overall lateral extension of the radiation shield -20- and thus only face half of the open end portions of each of the transverse L-shaped wings -37-.

Each of the transverse inner U-shaped insulation channels formed by the inner multi-layer insulation -36- is dimensioned such that it there is space for housing a transverse portion -32- of one thermal anchoring and former element -21- and a transverse portion -32- of an adjacent thermal anchoring and former element -21- separated from each other by a transverse space, which gap avoids a direct thermal contact between former elements -21-. On the other hand, each of the inner lateral U-shaped channels between the L-shaped profiles -26- and the lateral walls of the inner casing -40- is dimensioned such that one of the lateral portions of the thermal anchoring and former element -21- fits therein.

Each unit of the cryostat radiation shield -20- also comprises an inner cover plate -33- with a central opening. The inner cover plate -33- closes half of each of the inner transverse U-shaped channels in the transverse wings -37- and the inner lateral U-shaped channels.

The cryostat external jacket -19- comprises a plurality of jacket units each comprising two transverse U-shaped profiles -28- and two lateral U-shaped profiles -27- arranged such that the vertical edges of the inner vertical portions of the U-shaped profiles -27-, -28- abut against each other and thus delimit an inner passage. The vertical edges of the outer walls of each of the lateral U-shaped profiles -27- abut against the vertical edges of respective outer L-shaped profiles -31-, and the edges of the central section of the lateral U-shaped profiles abut against the horizontal portion of the outer L-shaped profiles -31-. The horizontal portions of each of the outer L-shaped profiles -31- thus flush with the respective central sections of the U-shaped profiles -27- whilst the vertical portions of the outer L-shaped profiles flush with the respective wall portions of the outer L-shaped profiles -31-. An outer lateral channel is thus formed by each of lateral U-shaped profiles -27- and the respective outer L-shaped profiles -31-.

Each of the transverse U-shaped profiles -28- forms an outer transverse U-shaped channel wherein there are three outer low thermal conductivity rests -30- for supporting an outer U-shaped multi-layer insulation -35- forming an outer transverse insulation channel. Each of the outer transverse insulation channels is dimensioned such that one of the transverse walls of the inner casing -40- and one of the L-shaped wings -37- fits therein. On the other hand, each of the outer lateral channels is dimensioned to house one of the lateral L-shaped profiles -26- of a unit of the cryostat radiation shield -20- such that the inner vertical portions of the lateral U-shaped profile -27- can be inserted into the opening in the unit of cryostat radiation shield -20- and the outer vertical portion of each of the lateral L-shaped profiles -26- becomes positioned in a middle portion of the outer U-shaped channel.

Each unit of the cryostat external jacket -19- further comprises an outer cover plate -34- that covers the outer transverse channels and the outer lateral channels thereof. The outer cover plate -34- has a central opening that is shaped complementarily to the shape of the inner passage of the unit of the cryostat jacket -19- so that, the unit of the cryostat jacket -19- can be inserted over one of the iron poles -6- of the rotor back iron -7-.

Each of the transverse portions of the thermal anchoring and former elements -21-, of the units of the radiation shield -20- and of the units of the cryostat external jacket -19- shown in FIGS. 5 and 6 is positioned between two adjacent iron poles -6- when the unit of the cryostat -10- is mounted on an iron pole -6-. The transverse portion of each of the units of the cryostats -10- comprising these elements -19-, -20-, -21- can thus be defined as an interpolar element or portion of the cryostat -10-.

As apparent from the drawings, the cryostat -10- enclosing the superconducting cods -24- is a double-jacket vacuum vessel whose "Hamster Wheel"-like geometry is designed to couple with the rotor structure. It exhibits minimum thermal loss (from radiation and conduction) and enhances the flux-diversion capability of the iron poles by reducing the air-gap length, thus strengthening the air-gap magnetic flux (for a given Ampere-turns value of the superconducting coils) while weakening the leakage flux that leaps across the superconducting coils -24-.

Figure 7:
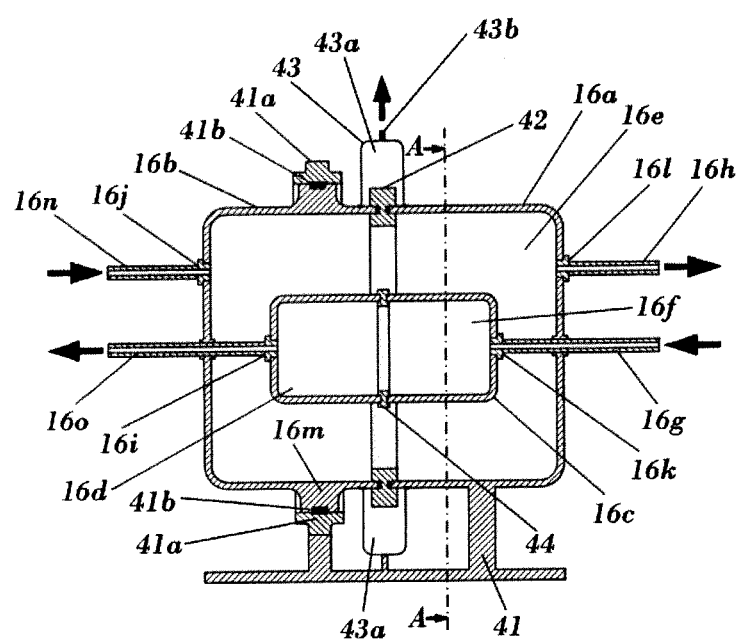
FIG. 7 is a sectional view of an embodiment of the rotary feedthrough.

The rotary feedthrough -16- shown in FIGS. 7 and 8 comprises a stationary low pressure portion -16a- and a rotary low pressure portion -16b- enclosing a low pressure chamber -16e-. The low pressure portions -16a-, -16b- are rotatably assembled to each other by means of a low pressure rotary sealing structure -42-. The stationary low pressure portion -16a- is fixed to a support -41- that comprises an annular supporting portion -41a- in which the rotary low pressure portion -16b- is rotatably supported. For this purpose, the rotary low pressure portion -16b- has a peripheral annular thickening -16m- protruding from its outer surface and bearings -41b- located between the annular supporting portion -41a- and the annular thickening -16m-.

The rotary low pressure portion -16b- comprises a low pressure inlet -16j- connected to a low pressure inlet pipe that is connected to a flexible recovery line -17b-, and the stationary low pressure portion -16a- comprises a low pressure outlet -16l- connected to a low pressure outlet pipe -16h-, such that coolant flowing from the cold heads -18- through the flexible recovery line -17b- enters the low pressure chamber -16e- through the low pressure inlet -16j-, leaves the low pressure chamber -16e- through the low pressure outlet -16l- in the stationary low pressure portion -16a- and is lead to the cryocooler compressor -15- through the low pressure outlet pipe -16h-.

Inside the low pressure chamber -16e- there is a high pressure chamber -16f- comprised within a stationary high pressure chamber portion -16c- and a rotary high pressure chamber portion -16d-. The stationary high pressure portion -16c- comprises a high pressure inlet -16k- connected to a high pressure inlet pipe -16g- that extends through the low pressure chamber -16e-, penetrates to the vertical wall of the stationary low pressure portion -16a- and thus connects the high pressure chamber -16f- with the cryocooler compressor -15-. The rotary high-pressure portion -16d- comprises a high-pressure outlet -16i- connected to a high-pressure outlet pipe -16o- that extends through the low-pressure chamber -16e- in an opposite direction, penetrates through the vertical wall of the rotary low-pressure portion -16b- and connects with a flexible delivery line. Thereby, high pressure coolant is delivered from the compressor to the cold heads.

The high pressure chamber portions -16c-, -16d- are coupled to each other by a high pressure sealing structure -44- such that the rotary high pressure portion -16d- rotates in respect of the stationary high pressure portion -16c-. The high pressure sealing structure -44- is connected to the low pressure sealing structure -42-. The rotary high-pressure portion -16d- and the rotary low-pressure portion -16b- thus rotate simultaneously with the rotor of the wind turbine.

The periphery of the low pressure sealing structure -42- is sealingly enclosed by an annular leakage recovery casing -43- comprising an inner leakage recovery chamber -43a- and a recovery outlet -43b-. Coolant leaking through the low pressure sealing -42- is just retained by within the recovery chamber -43a- from where it may be extracted through the recovery outlet -43-.

In the afore described high pressure sealing structure -44- of the rotary feedthrough -16-, the sealing portion is of a material providing low friction to allow rotation of the rotary high pressure portion -16d- and good sealing properties to minimize leakage of the high pressure coolant. Coolant leaking from the high pressure chamber -16f- enters the low pressure chamber -16e- and is transported to the compressor -15-. The low pressure sealing portion of the low pressure sealing structure -41- may be lubricated with a suitable lubricant such as oil.

Figure 9:
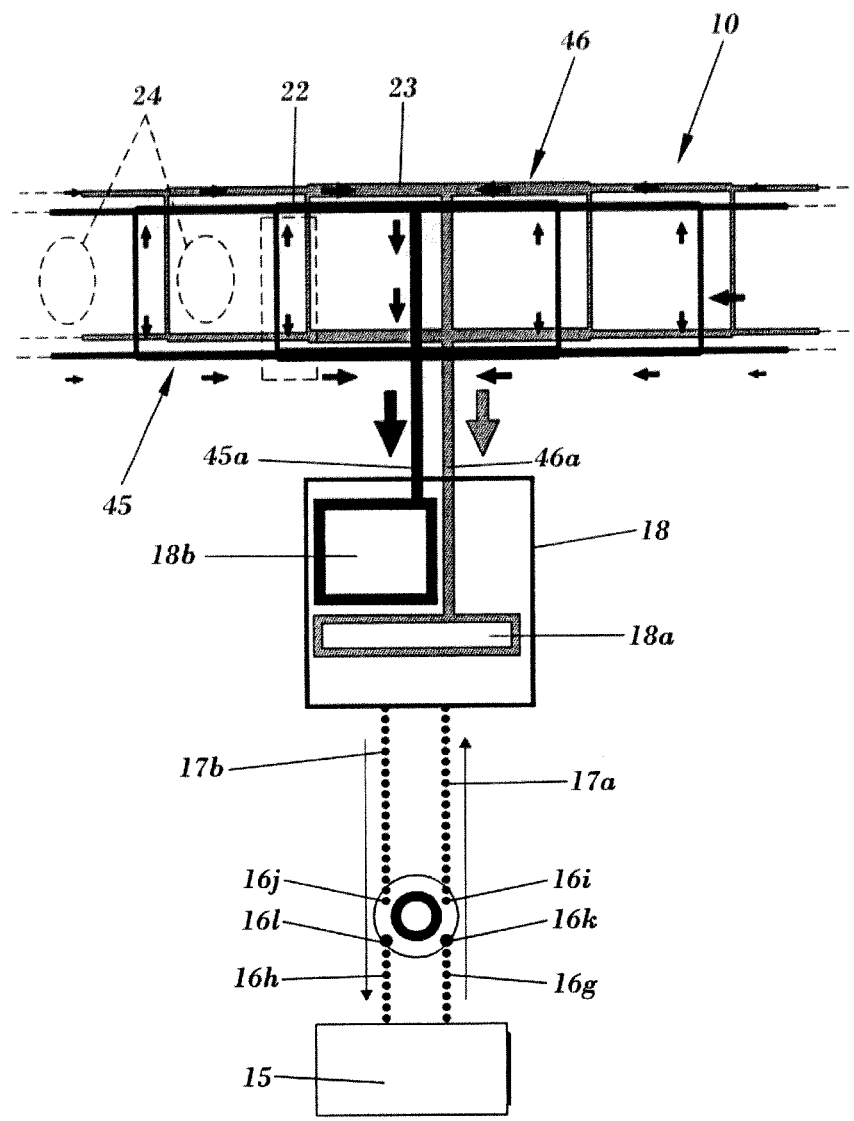
FIG. 9 is a schematic view of an embodiment of the thermal low temperature circuit and the high-temperature circuit of the cryogenic system.

FIG. 9 shows that the cryostat -10- hosts two thermal circuits, in parallel though not independent from each other, i.e. a low-temperature thermal circuit -45- operating at a temperature of, for example, 15 K, and a high-temperature thermal circuit -46- operating at a temperature of, for example, 80 K. Low-temperature thermal circuit -45- comprises low-temperature thermal circuit elements -22- and high-temperature thermal circuit -46- comprises high-temperature thermal circuit elements -23-. Heat enters to the cryostat -10- and thus to the thermal circuits -45-, -46- from the outside via radiation and conduction (through the rest elements supporting the superconducting coils), the heat sinks being the two stages -18a-, -18b- of the cold heads -18- of the cryocoolers -15- operating at different temperatures.

As shown in FIG. 9, the invention ensures that no coolant enters the cryostat -10- neither superconducting coils -24-. Coolant i.e. helium at a pressure of 10-25 bar leaves the stationary compressor -15- and is led to each of the cold heads -18- through the rotary feedthrough -16- and one of the flexible delivery lines -17a-. A Gifford-McMahon thermodynamic cycle takes place in each of the stages such that each cold head -18- reaches different temperatures, for example 80-100 K in the first stage -18a- and 15-20 K in the second stage -18b-. Since heat removal at cryogenic temperatures is rather inefficient, vacuum pumps are used to achieve a very low pressure in the cryostat -10- so as to minimize thermal flux carried by the gas molecules inside the vessel and in contact with the walls of the cryostat -10-. Inside the cryostat, there are two thermal circuits, i.e. the low temperature circuit -45- and the high temperature circuit -46-, that drive heat entering the cryostat -10- to the cold heads -18-. Helium present in the cold heads -18- then returns to the compressor -15- at a pressure of 10-15 bar.

The cryostat low-temperature circuit -45- comprises the above mentioned low-temperature heat transmission elements -22- and is thermally connected to the second stage -18b- of the cold head -18- by means of a low-temperature connection -45a-. The cold head second stage -18b- thus acts as heat sink for the low-temperature circuit -45-. On the other hand, the cryostat high temperature circuit -46- comprises above mentioned high-temperature heat transmission elements -23- and is thermally connected to the first stage -18a- of the cold head -18- by means of a high-temperature connection -46a-. The cold head first stage -18a- thus acts as heat sink for the high-temperature circuit -46-. Each of the transmission elements -22-, -23- receives heat-flux due to jacket-to-jacket radiation of the various elements composing the cryostat -10- and through the inner rest elements -29- supporting the superconductive coils -24-. Since heat adds up along the circumferential branches of the thermal circuits -45-, -46-, the thermal transmission elements -22-, -23- of each of the thermal circuits -45-, -46- are made thicker the nearer they are to a cold head -18-. The thermal transmission elements -22-, 23- and the connections -45a-, 46a- of the thermal circuits -45-, 48- to the cold heads -18- are made of materials exhibiting a very good conductivity at cryogenic temperatures. A suitable material is, for example, oxygen-free copper.

As apparent from the above description, the superconducting coils -24- are kept at their operating temperature by a so called "cryogen-free" system, as the coolant circulates only within the cooling system comprised of the compressor -15-, the feedthrough -16-, the pairs of flexible lines -17- and the cold heads -18-, but not in the thermal circuits of the cryostat that remove the heat. In fact, no gas or liquid enters the cryostat.

The rotor magnetic iron i.e. the laminated iron poles -6- and back-iron -7-, are kept warm. The iron poles -6- are used as a magnetic flux-diverter and are properly shaped to reduce the harmonic contents of the air-gap magnetic flux density wave generated by the superconductive coils -24-, as converters for power ratings in the range mentioned above may have problems in dealing with voltage waves exhibiting high harmonic content. Because of the large current carried by the superconductive coils -24-, high magnetic flux densities can be established across long air-gaps. The magnetic part of the stator consists of the annular -8-back-yoke made of laminated magnetic iron without iron teeth hosts the air-gap windings -11- fixed to it via the non-magnetic air-gap windings frame -14-. A cooling system (not shown in the drawings) is provided for the stator depending on the value of the armature current density. The cooling system can consist of a set of air blowers or coolant(s) (e.g. water or oil) circulating in pipes surrounding the stator or directly inside hollow conducts inside the stator.

As apparent from the above, in view that no coolant is in direct contact with the superconducting coils, the present invention inter alia offers the advantages of requiring only relatively small amounts of coolant and simplifying the cryostat structure. Additionally, conventional, rather reliable off-the-shelf cryocoolers may be used in the cryocooling system.

The invention claimed is:
1. A direct-drive electric generator with superconducting coils for a wind turbine, the generator (3) comprising
   a stator assembly (5, 8, 9, 11, 12) comprising air-gap stator windings (11), an air-gap windings frame (12), an annular stator back yoke (8) and a stator frame (9);
   a rotor assembly (2, 6, 7, 14) rotatable within the stator assembly (5, 8, 9, 11, 12),
   wherein the rotor assembly comprises a rotor back iron (7) with protruding iron poles (6) there-from;
   a plurality of superconducting coils (24) positioned on the rotor assembly (2, 6, 7, 14);
   a cooling system (15, 16, 17, 18) comprising a compressor (15), a feedthrough (16), transmission lines (17) and cryocooler cold-heads (18) for cooling the superconducting coils (24) down to a suitable cryogenic temperature; the cold heads (18) being connected through the lines (17) to the compressor such that coolant can be delivered and recovered from the cold heads (18);
   and a modular cryostat (10) comprising a plurality of cryostat modules,
   wherein each cryostat module houses a superconducting coil (24) for optimal thermal insulation of the same (24),
   wherein the modular cryostat (10) is adapted to rotate synchronously with the rotor and is positioned on the outer surface of the rotor back iron (7), has a round- ladder like geometry comprising a plurality of central openings adapted to host the protruding rotor iron poles, is free of cooling fluid and is adapted to keep the cryogenic temperatures by means of connections to the plurality of cold heads (18) through heat transmission circuits (45, 46).

2. The electric generator according to claim 1 further comprising means for generating a low pressure inside the cryostat and wherein each cold head (18) has two stages, a low temperature one (18*b*) and a high temperature one (18*a*), the cryostat transmission elements being one connected to the low temperature stage and the other connected to the high temperature stage, such that each cold head (18) acts as a heat sink absorbing heat from inside the modular cryostat (10).

3. The electric generator according to claim 2, wherein each cryostat module comprises a thermal anchoring and former element (21) enclosing a superconducting coil, a radiation shield (20) and a cryostat external jacket (19), the radiation shield (20) being thermally anchored to the cryocooler high temperature stage (18*a*) through a thermal circuit element (23) and being housed in the cryostat external jacket (19) and the thermal anchoring and former element (21) being housed in the radiation shield (20) and in thermal contact with the cryocooler low temperature stage (18*b*), through a low temperature thermal circuit element (22).

4. The electric generator according to claim 3, wherein the modular cryostat (10) comprises interpolar transverse sections positioned between the adjacent iron poles (6), each interpolar section comprising a transverse portion (28) of the cryostat external jacket (19) comprising an outer transverse U-shaped channel provided with an outer multi-layer insulation (35) and closed by a transverse portion of an outer cover plate (34);

a transverse portion (37) of the radiation shield (20) comprising an inner transverse U-shaped channel provided with an inner multi-layer insulation (36) and closed by a transverse portion of an inner cover plate (33);

two transverse portions (32) of respectively two adjacent thermal anchoring and former elements (21) separated from each other by a transverse space;

the transverse portion (37) of the radiation shield (20) is positioned within the outer multi-layer insulation (35) in the transverse portion (28) of the cryostat external jacket (19);

the two transverse portions (32) of the adjacent thermal anchoring and former elements (21) are positioned within the inner multi-layer insulation (36) in the transverse portion (37) of the radiation shield (20).

5. The electric generator according to claim 1, further comprising a rotary feedthrough (16) connected to a coolant outlet and to a coolant inlet of the cryocooler compressor (15) such that the lines (17) are in connection with the coolant outlet and a recovery line is in fluid connection with the coolant inlet.

6. The electric generator according to claim 5 wherein the rotary feedthrough (16) comprises a low pressure chamber (16*e*) connected to a low pressure circuit and fluidly connected to a first stage (18*a*) of at least one cold head (18), said first stage (18*a*) being thermally coupled to the low-temperature circuit (46) in the modular cryostat (10);

a high pressure chamber (16*h*) housed within the low pressure chamber (16*e*) and fluidly connected to a high pressure circuit thermally coupled to a second stage (18*b*) of said at least one cold head (18), said second stage (18*b*) being thermally coupled to the high-temperature circuit (45) in the modular cryostat (10);

a low pressure sealing structure (41) dividing the low pressure chamber (16*e*) into a stationary low pressure portion (16*a*) and a rotary low pressure portion (16*b*), the rotary low pressure portion (16*b*) being rotary in the low pressure sealing structure (41);

a high-pressure sealing structure (44) dividing the high-pressure chamber (16*f*) into a stationary high-pressure portion (16*c*) and a rotary high-pressure portion (16*d*), the rotary high-pressure portion (16*d*) being rotary in the high pressure sealing structure (44), the high-pressure sealing structure (44) being mounted to the low-pressure sealing structure (41).

* * * * *